H. P. STRAHL.
FILTER.
APPLICATION FILED FEB. 19, 1909.
945,632.
Patented Jan. 4, 1910.
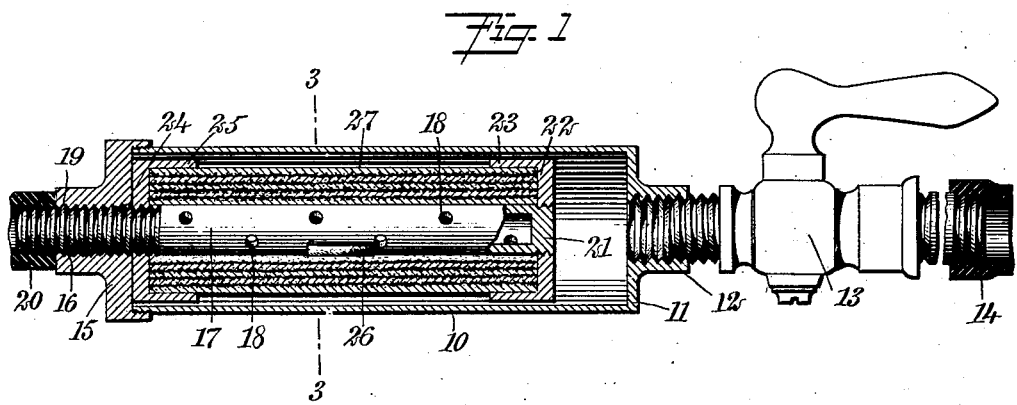
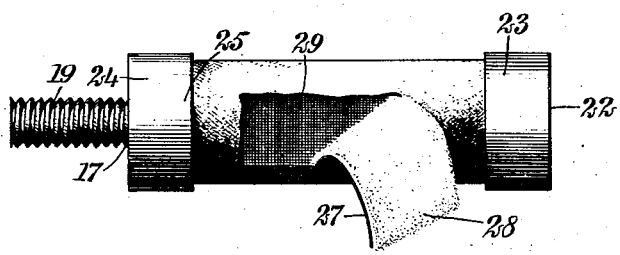
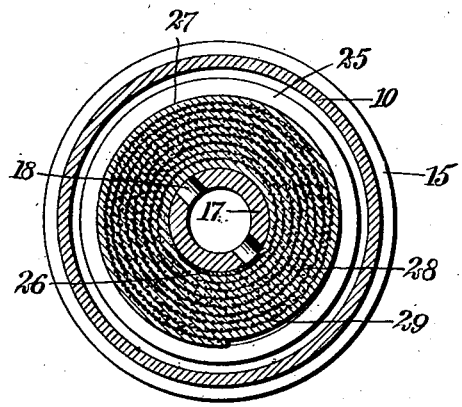
WITNESSES
INVENTOR
Howard P. Strahl
BY
ATTORNEYS

UNITED STATES PATENT OFFICE.

HOWARD PHILIP STRAHL, OF CLEVELAND, OHIO.

FILTER.

945,632.  Specification of Letters Patent.  Patented Jan. 4, 1910.

Application filed February 19, 1909. Serial No. 478,770.

*To all whom it may concern:*

Be it known that I, HOWARD P. STRAHL, a citizen of the United States, and a resident of Cleveland, in the county of Cuyahoga and State of Ohio, have invented a new and Improved Filter, of which the following is a full, clear, and exact description.

This invention relates to filters especially useful in filtering air, and relates more particularly to a filter comprising a casing, a perforated tube within the casing, spaced caps at the ends of the perforated tube, and filter material surrounding the tube between the caps, the caps having flanges which project over the material to hold it in place.

An object of the invention is to provide a simple, inexpensive and durable filter for filtering air or other fluids, with which filter material of different kinds can be employed, in which the filter material is securely held in place by adjustable caps, and in which the casing has a head forming a lock nut for one of the caps.

A further object of the invention is to provide a device of the class described, which can be employed for various purposes in filtering air, which can be easily taken apart to permit of its cleansing, and in which surgical linen or like fabrics, and wire gauze or net are employed as filter material.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is a longitudinal section of an embodiment of my invention; Fig. 2 is a side elevation of the perforated tube and the filter material held in place thereon by means of the caps, part of the material being broken away; and Fig. 3 is an enlarged transverse section on the line 3—3 of Fig. 1.

Before proceeding to a more detailed explanation of my invention it should be clearly understood that while the same is particularly useful for filtering air, it can also be advantageously employed in filtering other fluids such as liquids. I have found that in certain surgical work it is necessary to spray solutions into wounds and the like, and that for this purpose the air used in spraying must be as nearly pure as possible. My filter is well adapted to remove impurities from air when it is placed between a source of compressed air and a spraying apparatus. It can also be advantageously employed in connection with pneumatic tools. Under the last-mentioned circumstances it removes from the air the moisture, which tends to rust the tools.

Referring more particularly to the drawings, I provide an outer filter casing or barrel 10, having one end closed by an integral head 11, which is provided with an extension 12, having a threaded opening therethrough and forming an inlet for the casing. The inlet can be connected in any suitable way with the air supply, for example, by means of a controlling cock 13 of the usual form and a flexible tube 14. At the end remote from the inlet, the casing is threaded at the outside and receives a correspondingly threaded removable casing head 15 which has an extension 16 provided with a threaded opening therethrough.

A perforated tube 17 is arranged within the casing and has openings 18 to permit the escape of air therethrough. The tube 17 has one end 19 threaded and arranged within the threaded opening of the casing head 15. It projects from the casing head to receive removably, a flexible tube 20 or other conduit for connecting it with the point at which the air is to be employed. The free inner end 21 of the tube 17 is threaded and carries a cap 22, having a correspondingly threaded opening therethrough and provided with a laterally extending flange 23, at the rim. A similar, oppositely disposed cap 24, having an annular flange 25, is mounted at the other end of the tube 17 upon the threaded part 19 within the casing. The caps are adjustable owing to their threaded engagement with the tube 17, and the casing head 15 forms a lock nut for the cap 24, as it can be screwed against the same. The head 15 also serves to hold the inner tube in position within the casing.

The filter material is wound or otherwise applied around the tube 17, and the flanges 23 and 25 extend over the material at the ends, to hold it in place as is shown most clearly in Fig. 1. I prefer to employ as filter material, surgical linen or like fabric 28, and wire gauze 29, consisting preferably of fine mesh copper or brass net. The fabric and the net are superposed and then wound together upon the tube 17, thus forming about the same alternate layers of fabric and net. A strip 26 of suitable material can be secured to the tube and to the filter material, to hold the end of the latter in place when the winding of the same about the tube is begun. At the outside of the filter material are positioned several layers or windings of a heavier fabric 27, which serves as a protection for the other filter material and also retains the major part of the impurities. The air enters through the inlet 12 and passes through the filter material into the tube 17, escaping through the casing head 15 which communicates interiorly with the conduit 20. The threads at the free end 21 of the tube 17 are preferably oppositely disposed from the threads of the end 19. Thus, if the threads of the latter are right-hand threads, those at the end 21 will be left-hand.

Having thus described my invention, I claim as new, and desire to secure by Letters Patent:

1. A filter, comprising a casing, a perforated tube therein, spaced caps removably mounted upon said tube, and filter material between said tube and said casing, said caps having members extending longitudinally of the tube over said material to hold the same in place.

2. A filter, comprising a casing having a removable casing head, a perforated tube in said casing and carried by said head, caps on said tube, and filter material on said tube between said caps, said caps having flanges extending longitudinally of said tube over said material to hold the same in place, said casing having an inlet, said tube being adapted to communicate with an air conduit.

3. A filter, comprising a casing having at one end an inlet and at the other end a removable casing head, a perforated tube carried by said casing head and extending into said casing, caps mounted upon said tube and having laterally extending flanges, said casing head acting as locking means for one of said caps, and filter material wound about said perforated tube between said caps and under said flanges, said tube being adapted to communicate with an air conduit.

4. A filter, comprising a casing having a removable casing head, a perforated tube within said casing, caps mounted upon said tube, one of said caps being adjustable longitudinal of said tube, and filter material between said caps upon said tube, said caps extending over said material to hold the same in place.

5. A filter, comprising a casing having a screw casing head at one end, said casing head having a threaded opening therethrough, a perforated tube having a threaded portion mounted in said opening of said head, a cap mounted upon said threaded portion and having a lateral flange, a second cap upon said tube and having a lateral flange, said first cap being adjustable longitudinally of said tube, said casing head acting as a lock nut for said first cap, and filter material wound upon said tube between said caps and under the flanges thereof.

6. In a filter, a perforated member having alternate superposed layers of gauze and fibrous material wound thereon.

7. In a filter, a perforated member having wound thereon superposed layers of fibrous material and metal gauze, and a fabric encompassing said layers.

8. A filter, comprising a casing, a perforated tube in the casing and having its ends screw threaded, one end of the tube being closed and the other end projecting through one end of the casing and adapted to be connected with a conduit, filtering material on the tube, and means within the casing and screwing on the tube for holding the filtering medium in place on said tube.

9. A filter, comprising a casing having a removable head at one end, a perforated tube in the casing and having screw threaded ends, one of which is closed, the head of the casing screwing upon open end of the tube with said end projecting beyond said head and adapted to be connected with a conduit, filtering material on the tube, and means within the casing and screwing on the tube for holding the filtering material in place on the said tube.

10. A filter, comprising a casing having one end open and externally screw threaded, a perforated tube in the casing and having screw threaded ends, one of which is closed, filtering material on the tube, means within the tube and screwing on the threaded ends of the tube to hold the filtering material in place on said tube, and a head for the casing, said head screwing on the casing and the open end of the tube.

11. A filter, comprising a casing having an inlet at one end, a perforated tube having one end closed and arranged in the casing with its closed end adjacent to the inlet end of the casing and its open end projecting from the opposite end of said casing, and a filtering material on the said tube.

In testimony whereof I have signed my name to this specification in the presence of two subscribing witnesses.

HOWARD PHILIP STRAHL.

Witnesses:
S. G. OSMROD,
S. B. ROBINSON.